United States Patent
Ahn et al.

(10) Patent No.: US 11,787,549 B2
(45) Date of Patent: Oct. 17, 2023

(54) SOLID OXIDE FUEL CELL MODULAR HYBRID POWERTRAIN FOR SMALL UNMANNED AIRCRAFT SYSTEM (UAS)

(71) Applicants: Jeongmin Ahn, Manlius, NY (US); Thomas Welles, Syracuse, NY (US)

(72) Inventors: Jeongmin Ahn, Manlius, NY (US); Thomas Welles, Syracuse, NY (US)

(73) Assignee: SYRACUSE UNIVERSITY, Syracuse, NY (US)

( * ) Notice: Subject to any disclaimer, the term of this patent is extended or adjusted under 35 U.S.C. 154(b) by 369 days.

(21) Appl. No.: 17/264,955

(22) PCT Filed: Jul. 29, 2019

(86) PCT No.: PCT/US2019/043930
§ 371 (c)(1),
(2) Date: Feb. 1, 2021

(87) PCT Pub. No.: WO2020/033177
PCT Pub. Date: Feb. 13, 2020

(65) Prior Publication Data
US 2021/0323687 A1    Oct. 21, 2021

Related U.S. Application Data

(60) Provisional application No. 62/715,430, filed on Aug. 7, 2018.

(51) Int. Cl.
*B64D 27/24*      (2006.01)
*B60L 50/60*      (2019.01)
(Continued)

(52) U.S. Cl.
CPC .............. *B64D 27/24* (2013.01); *B60L 50/60* (2019.02); *B60L 50/70* (2019.02); *B64C 39/024* (2013.01);
(Continued)

(58) Field of Classification Search
CPC ........ B64D 27/24; B64D 33/04; B64D 41/00; B64D 2027/026; B64D 2041/005;
(Continued)

(56) References Cited

U.S. PATENT DOCUMENTS

2003/0136873 A1   7/2003   Churchman
2004/0053087 A1   3/2004   Akikusa et al.
(Continued)

OTHER PUBLICATIONS

International Search Report Form PCT/ISA/210, and Written Opinion Form PCT/ISA/237, International Application No. PCT/US2019/43930/097817, pp. 1-8 International Filing Date Jul. 29, 2019 dated of search report Oct. 9, 2019.

*Primary Examiner* — Michael C Zarroli
(74) *Attorney, Agent, or Firm* — Bond, Schoeneck & King, PLLC; David L. Nocilly

(57) ABSTRACT

A hybrid power system for an unmanned aerial system (UAS) having a liquid fuel engine and a solid oxide fuel cell coupled to the exhaust of the engine for generating electricity that is used by the electric motors of the UAS to create lift and control flight. A conventional remote control (r/c) liquid fuel engine may be used generate exhaust gases including hydrogen and carbon monoxide that are used by a SOFC coupled to the exhaust of the r/c engine to generate electricity. The electric motors of the UAS may thus be powered by the electricity generated by the SOFC.

15 Claims, 5 Drawing Sheets

(51) Int. Cl.
*B60L 50/70* (2019.01)
*B64C 39/02* (2023.01)
*B64D 33/04* (2006.01)
*B64D 41/00* (2006.01)
*H01M 8/00* (2016.01)
*H01M 8/0612* (2016.01)
*H01M 16/00* (2006.01)
*H02K 7/18* (2006.01)
*B64D 27/02* (2006.01)
*H01M 8/12* (2016.01)
*B64U 50/19* (2023.01)

(52) U.S. Cl.
CPC ............ *B64D 33/04* (2013.01); *B64D 41/00* (2013.01); *H01M 8/004* (2013.01); *H01M 8/0612* (2013.01); *H01M 16/006* (2013.01); *H02K 7/1815* (2013.01); *B60L 2200/10* (2013.01); *B64D 2027/026* (2013.01); *B64D 2041/005* (2013.01); *B64U 50/19* (2023.01); *H01M 2008/1293* (2013.01); *H01M 2220/20* (2013.01); *H01M 2250/20* (2013.01); *Y02E 60/50* (2013.01)

(58) Field of Classification Search
CPC ...... B60L 50/60; B60L 50/70; B60L 2200/10; B64C 39/024; H01M 8/004; H01M 8/0612; H01M 16/006; H01M 2008/1293; H01M 2220/20; H01M 2250/20; H02K 7/1815; B64U 50/19; Y02E 60/10; Y02E 60/50; Y02T 10/70; Y02T 50/60; Y02T 90/40

See application file for complete search history.

(56) References Cited

U.S. PATENT DOCUMENTS

| | | |
|---|---|---|
| 2005/0199191 A1 | 9/2005 | Loth et al. |
| 2007/0186876 A1* | 8/2007 | Elwart .................. B60K 6/24 |
| | | 429/513 |
| 2012/0122007 A1 | 5/2012 | Kuehn et al. |
| 2017/0203850 A1 | 7/2017 | Wang et al. |
| 2019/0063283 A1* | 2/2019 | Ahn .................. H01M 8/04022 |

\* cited by examiner

SOLID OXIDE FUEL CELL MODULAR HYBRID POWERTRAIN FOR SMALL UNMANNED AIRCRAFT SYSTEM (UAS)

CROSS-REFERENCE TO RELATED APPLICATION

The present application claims priority to U.S. Provisional Application No. 62/715,430, filed on Aug. 7, 2018.

BACKGROUND OF THE INVENTION

1. Field of the Invention

The present invention to a hybrid power system for an unmanned aircraft and, more specifically, to a remote control engine coupled with a Solid Oxide Fuel Cell (SOFC).

2. Description of the Related Art

Currently, small Unmanned Aircraft System ("UAS") (0 to 20 lb. max gross take-off weight) are of increasing interest as a research area as they have wide application to a variety of fields. These systems are being increasingly used for precision agricultural crop management and water resource visual inspection. For instance, growing concern over water resource management has precipitated a need to monitor the nation's watersheds, water runoff patters, rivers, lakes, and other crucial water resources. This monitoring involves large scale survey and mapping, which is costly and time consuming. A possible remedy for the situation includes adopting the use of a UAS outfitted with sensor packages and video equipment to perform the survey. UAS can be a cost effective avenue to survey water resources and track water runoff, contaminating water resources. UAS can be easily automated and fitted with sensors and cameras capable of providing actionable feedback to the user. However, nearly all UAS are powered by a typical remote controlled ("r/c") lithium polymer battery pack, which typically provides an endurance of approximately twenty minutes. This limits a UAS to only being operated in close proximity to the user. Current power plants for UAS are not suited for long duration missions, such as the survey of water resources. If the endurance time of operation could be increased, a UAS could be widely employed to perform water resource survey without costly equipment and man hours. Therefore, the development of a hybrid power plant is crucial for UAS to be utilized to their full potential as a survey tool.

Due to the high energy density of a liquid fuel when compared to a traditional lithium polymer battery, r/c engines may prolong the operation of a typical small UAS utilizing a lithium polymer battery by up to a factor of 5. Currently r/c engines cannot be directly used to power a multi-rotor UAS. A multi-rotor UAS would require multiple engines (one engine per rotor), each of which would need to be independently throttled. Therefore directly using r/c based engines would greatly increase the weight and control complexity of a UAS. In addition, engine spool time is too long for adequate UAS control, and it is difficult to tune all engines to identical operating conditions.

BRIEF SUMMARY OF THE INVENTION

The present invention provides a hybrid system that can utilize a liquid fuel while generating electrical power for the onboard motors, thereby providing for extending range without increasing complexity. The present invention uses a conventional remote control (r/c) liquid fuel engine that generates exhaust gases including hydrogen, hydrocarbons, and carbon monoxide and a SOFC coupled to the exhaust of the r/c engine that utilizes the hydrogen and carbon monoxide to generate electricity. The electric motors of the UAS may thus be powered by the electricity generated by the SOFC. The increased chemical energy density of a liquid fuel as compared to traditional batteries, along with ease of storage, accessibility, and refuel time make the use of a liquid fuel powered UAS preferable when compared to a battery only powered UAS. Testing of a lone small electrical generator hybrid system showed transient power peaking that could lead to a destabilization of the controller, and so utilization of a fuel cell is chosen to offer higher efficiency as well as stable power generation.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
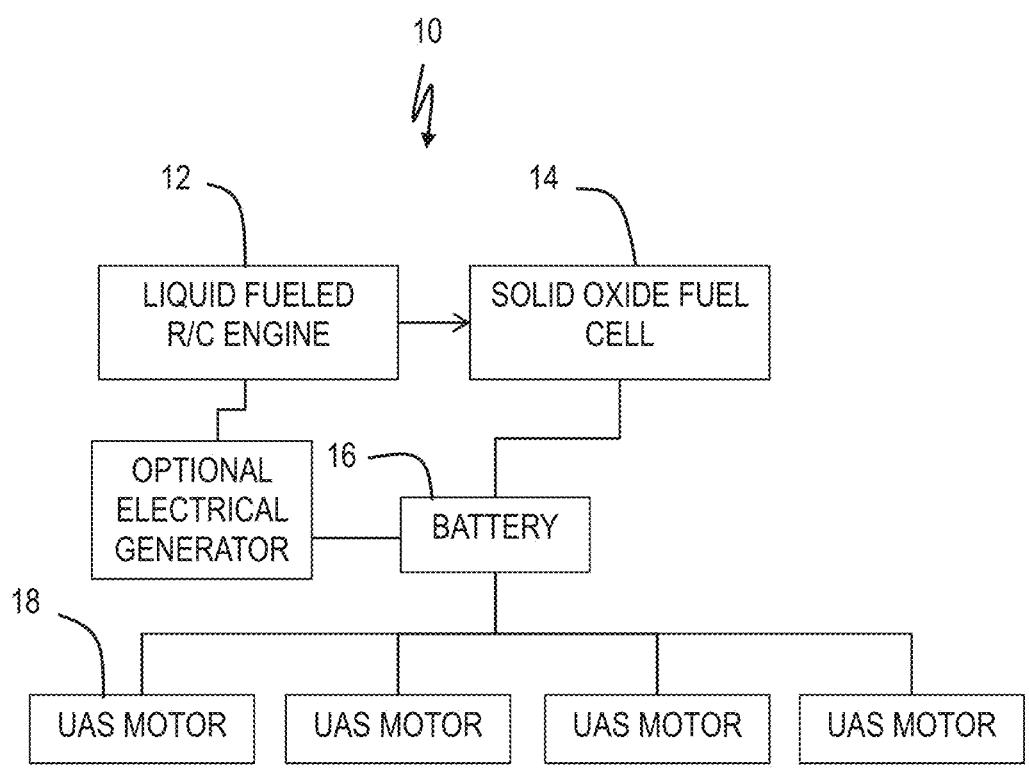
FIG. 1 is a schematic of a hybrid power system for an unmanned aerial system according to the present invention.

Referring to the figures, wherein like numeral refer to like parts throughout, there is seen in FIG. 1 a hybrid power train system 10 that can be implemented onto a UAS. The UAS may have fixed wing or multi-rotor under 20 lb. The hybrid power train system may comprise a traditional r/c engine 12 and a solid oxide fuel cell (SOFC) stack 14, as well as a small battery 16 to form a modular hybrid powertrain system that can power one or more motors 18 that provide flight and flight control for the UAS. The battery may be at least an order of magnitude smaller than those lithium polymer battery packs currently used in powering conventional UAS and will only be used for the engine starting procedure, as well as transient power balancing.

Figure 2:
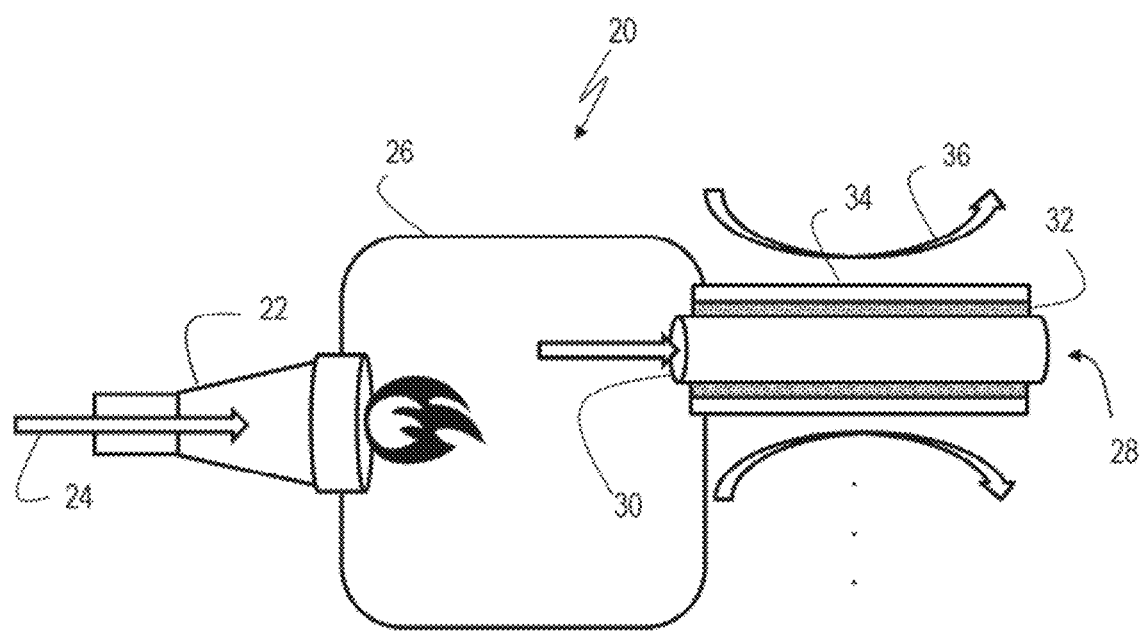
FIG. 2 is a schematic of a micro-tubular Flame-assisted Fuel Cell (FFC) for use in the present invention.

There is seen in FIG. 2 an acceptable embodiment of a micro-tubular flame-assisted fuel cell (FFC) 20. The operating principle of the FFC is based on the combination of a flame with a micro-tubular SOFC in a simple setup. The flame serves as fuel-flexible partial oxidation reformer which generates $H_2$ and CO, while simultaneously providing the heat required for SOFC operation. In the combined system, the flame and fuel cell are inherently coupled and used to generate electricity from the exhaust of a liquid fueled r/c engine. More specifically, for fuel cell 20, a burner 22 is used to ignite a fuel and air mixture 24 in a combustion chamber 26. The exhaust from burner 22 is fed through a stack of micro-tubules 28, each one of which includes a tubular anode 30 surrounded by a electrolyte 32 and a cathode 34. Oxidation air 36 is supplied to cathode 34 and the resulting reaction produces the electrical voltage for use by battery 16 and/or motors 18.

Fuel cells provide a clean and versatile means to directly convert chemical energy to electricity. Among the many types of fuel cells, SOFCs have received attention due to their simplicity (no moving parts), fuel flexibility and use of inexpensive materials. In one embodiment of this invention, the SOFC utilizes $H_2$ and CO to generate electricity. The operating temperature of an SOFC is about 500-1000° C. This operating temperature of the SOFC allows for internal reforming and promotes rapid kinetics without the need for precious materials. Instead of operating the fuel cell with a flame, the fuel reforming and heat source is be a nitromethane and methanol fueled r/c engine. R/c engines are inexpensive, reliable, and run on inexpensive widely available methanol based fuel.

Initial testing of an r/c engine operating under normal conditions without modification indicates that the r/c engines can generate syngas, $H_2$, and CO. At the same time, the r/c engine will generate heat. The syngas can be utilized by the SOFC as a fuel source and the heat provides an operating temperature for the SOFC. From initial tests, between 11 and 15 percent of the exhaust gas can be immediately utilized as a fuel source for the SOFC, with a temperature high enough for proper operation of the SOFC. Further fuel mixture and engine tuning will allow for increased syngas production and therefore achieving optimal SOFC performance.

Figure 3:
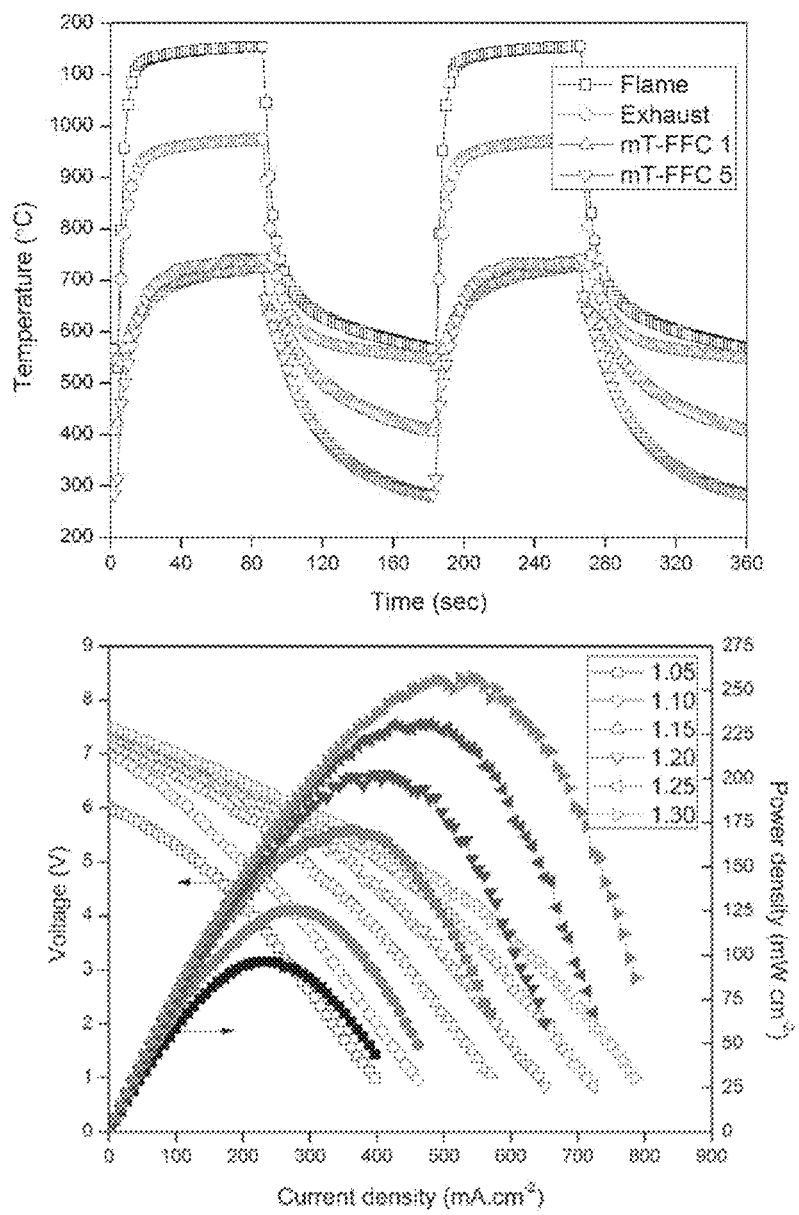
FIG. 3 is a pair of graphs of solid oxide fuel cell performance and thermal cycling curves.

In order for a hybrid system to function properly for a small UAS, the system must be able to cycle without degradation. Accordingly, an SOFC stack was tested in combustion exhaust at a wide range of equivalence ratios and achieved a high power density (~250 mW/cm$^2$) that is comparable to performance achieved in many state-of-the-art fuel cell devices. The power and polarization curves for combustion equivalence ratios of 1.05, 1.10, 1.15, 1.2, 1.25 and 1.3 are shown in FIG. 3. After confirming the potential power, the stack was thermal cycled (i.e., the burner was turned on/and off allowing the fuel cell to heat up/cool during the on/off cycling) for 3,010 cycles. Achieving many thermal cycles without significant degradation indicates that an SOFC could be utilized for a UAS application, in which the system will be cycled on and off repeatedly throughout a service life. Temperature profiles for the flame, exhaust, and two of the fuel cells are also shown in FIG. 3. The recorded voltage is that of the 9 cell stack wired in series and accounts for the seemingly large voltage. The power density is reported per active area of the cathode.

Figure 4:
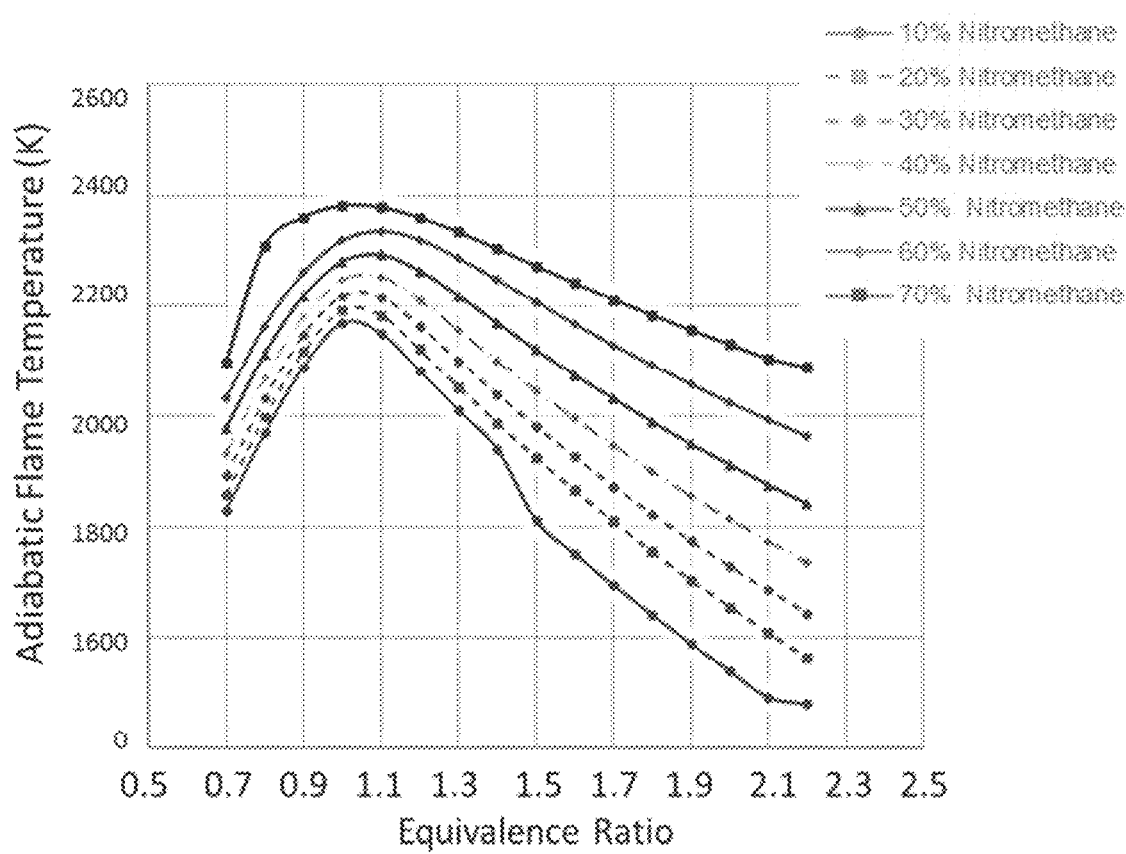
FIG. 4 is a graph of CEA adiabatic flame temperatures.

A chemical equilibrium analysis was performed using NASA CEA software for mixtures of methanol and nitromethane to determine adiabatic flame temperature as well as a potential indication of syngas production. CEA analysis showed that nitromethane concentration had little effect on overall syngas production. Overall syngas production between the various fuel mixtures resulted in less than 5% variation. However, the adiabatic flame temperature, as seen in FIG. 4, varied significantly with nitromethane concentration. Increased nitromethane percentage increased adiabatic flame temperature significantly. High nitromethane concentration also maintained higher temperatures as the equivalence ratio increased. Therefore, the operating condition of the engine can be pushed to richer conditions for syngas production without compromising heat energy needed to operate a SOFC.

Figure 5:
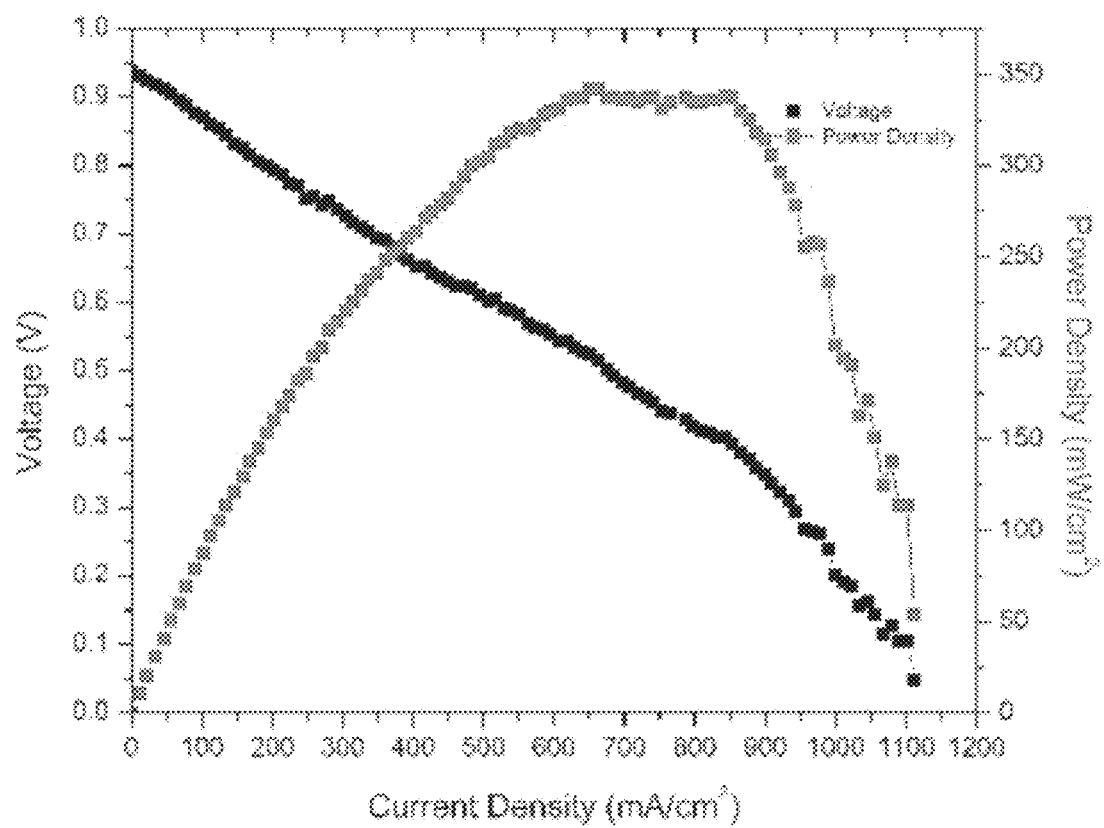
FIG. 5 is a graph of SOFC performance in engine exhaust.

Testing was performed with a fuel mixture of 30% nitromethane, 70% methanol to prevent overheating and damage as the engine was being used for the first time. Operating at idle conditions with the carburetor tuned slightly rich produced a total of 14% syngas, indicating that the exhaust gas can be immediately utilized as a fuel source for the SOFC. The engine produced ~70 L·min$^{-1}$ of exhaust at idle with a composition of ~12% CO and ~1.5% hydrogen, resulting in a peak power density of ~340 mW/cm$^2$, as seen in FIG. 5.

What is claimed is:

1. A hybrid powertrain for an unmanned aerial system, comprising:
   an unmanned aircraft having a plurality of rotors driven by a plurality of motors, respectively;
   a power train implemented on the unmanned vehicle, wherein the power train includes a liquid fueled engine having an exhaust that can expel hydrogen and carbon monoxide a solid oxide fuel cell coupled to the exhaust of the engine and the plurality of rotors to generate electricity using the hydrogen and carbon monoxide from the liquid fueled engine and provide the electricity to the plurality of motors.

2. The powertrain of claim 1, further comprising an electrical generator coupled to a shaft of the liquid fueled engine.

3. The powertrain of claim 2, further comprising a battery interconnected between the solid oxide fuel cell and the at least one electric motor.

4. The powertrain of claim 3, wherein the solid oxide fuel cell comprises a micro-tubular flame-assisted fuel cell.

5. The powertrain of claim 4, wherein the micro-tubular flame-assisted fuel cell comprises a plurality of micro-tubular fuel cells coupled to the exhaust.

6. The powertrain of claim 5, wherein each of the plurality of micro-tubular fuel cells comprises a tubular anode surrounded by an electrolyte and a catalyst.

7. The powertrain of claim 6, further comprising a liquid fuel source coupled to the liquid fueled engine.

8. The powertrain of claim 7, wherein the liquid fuel source comprises a mixture of nitromethane and methanol.

9. The powertrain of claim 8, wherein the mixture comprise 30 percent nitromethane and 70 percent methanol.

10. A method of delivering power to an unmanned aerial system, comprising the steps of:
    providing a hybrid powertrain having a liquid fueled engine and an exhaust, a solid oxide fuel cell coupled to the exhaust of the engine, and at least one electric motor coupled to the solid oxide fuel cell on an unmanned aircraft having a plurality of rotors driven by a plurality of motors, respectively;
    operating the liquid fueled engine to produce an exhaust including hydrogen and carbon monoxide;
    delivering the exhaust to the solid oxide fuel cell such that electricity is generated by the solid oxide fuel cell; and
    powering the plurality of motors using the electricity generated by the solid oxide fuel cell.

11. The method of claim 10, wherein the hybrid powertrain further includes an electrical generator coupled to a shaft of the liquid fueled engine.

12. The method of claim 11, further comprising a battery interconnected between the solid oxide fuel cell and the at least one electric motor.

13. The method of claim 12, wherein the solid oxide fuel cell is a micro-tubular flame-assisted fuel cell.

14. The method of claim 13, further comprising the step of delivering a liquid fuel to the liquid fueled engine.

15. The method of claim 14, wherein the liquid fuel comprises a mixture of nitromethane and methanol.

* * * * *